United States Patent
Kvist et al.

(10) Patent No.: US 12,207,053 B2
(45) Date of Patent: *Jan. 21, 2025

(54) HEAD-WEARABLE HEARING INSTRUMENT WITH IMPROVED CO-EXISTENCE OF MULTIPLE COMMUNICATION INTERFACES

(71) Applicant: GN Hearing A/S, Ballerup (DK)

(72) Inventors: Søren Helstrup Kvist, Værløse (DK); Thorvaldur Oli Bodvarsson, Værløse (DK)

(73) Assignee: GN HEARING A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,161

(22) Filed: Nov. 6, 2023

(65) Prior Publication Data
US 2024/0073632 A1    Feb. 29, 2024

Related U.S. Application Data

(63) Continuation of application No. 18/121,567, filed on Mar. 14, 2023, now Pat. No. 11,917,374, which is a
(Continued)

(30) Foreign Application Priority Data

Jul. 27, 2020  (DK) .......................... PA 2020 70500

(51) Int. Cl.
*H04R 25/00*    (2006.01)
*H04B 7/26*    (2006.01)

(52) U.S. Cl.
CPC ......... *H04R 25/554* (2013.01); *H04B 7/2643* (2013.01); *H04R 2420/07* (2013.01); *H04R 2460/01* (2013.01)

(58) Field of Classification Search
CPC .............. H04R 25/554; H04R 2420/07; H04R 2460/01
See application file for complete search history.

(56) References Cited

U.S. PATENT DOCUMENTS 7,403,629 B1    7/2008  Aceti et al.
9,763,017 B2    9/2017  Roeck
(Continued)

FOREIGN PATENT DOCUMENTS

CN    101080945    11/2007
CN    104853302    8/2015
(Continued)

OTHER PUBLICATIONS

Non-Final Office Action for U.S. Appl. No. 18/121,567 dated Jul. 7, 2023.
(Continued)

*Primary Examiner* — Sunita Joshi
(74) *Attorney, Agent, or Firm* — Vista IP Law Group, LLP

(57) ABSTRACT

The present disclosure relates in a first aspect to a head-wearable hearing instrument comprising first and second portions and a radio-frequency data communication interface configured to transmit and receive data packets at transmit and receipt time slots, respectively, through a wireless communication channel. The head-wearable hearing instrument comprises a connector assembly configured to electrically and mechanically interconnect the first portion with the second portion. The second portion comprises a sensor configured to measure a physical property and generate sensor data representative of the measured physical property. The head-wearable hearing instrument further comprises a wired data communication link extending between the first and second portions through the connector assembly for transmission of sensor data during transmit (Continued)

time slots. Said transmit time slots of the sensor data and at least said receipt time slots of the wireless communication channel are non-overlapping in time.

23 Claims, 4 Drawing Sheets

Related U.S. Application Data continuation of application No. 17/367,282, filed on Jul. 2, 2021, now Pat. No. 11,653,158.

(56) References Cited

U.S. PATENT DOCUMENTS

| | | | |
|---|---|---|---|
| 2004/0116151 | A1 | 6/2004 | Bosch et al. |
| 2012/0310395 | A1 | 12/2012 | El-hoiydi |
| 2013/0343584 | A1 | 12/2013 | Bennett et al. |
| 2016/0249356 | A1* | 8/2016 | Pope ............... H04W 52/0216 |
| 2017/0055089 | A1 | 2/2017 | Pedersen et al. |
| 2017/0150279 | A1 | 5/2017 | Solum |
| 2018/0192211 | A1 | 7/2018 | Møller et al. |
| 2018/0317030 | A1* | 11/2018 | Troelsen ............... H04R 25/554 |
| 2019/0253793 | A1 | 8/2019 | Pedersen et al. |
| 2020/0053460 | A1 | 2/2020 | Pedersen et al. |
| 2020/0145350 | A1 | 5/2020 | Treue et al. |

FOREIGN PATENT DOCUMENTS

| | | |
|---|---|---|
| CN | 106255025 | 12/2016 |
| CN | 106797519 | 5/2017 |
| CN | 106937196 | 7/2017 |
| CN | 108260063 | 7/2018 |
| CN | 108271109 | 7/2018 |
| CN | 109196878 | 1/2019 |
| CN | 111225365 | 6/2020 |
| CN | 111314833 | 6/2020 |
| EP | 2545719 | 11/2013 |
| EP | 3343952 | 7/2018 |
| EP | 2942979 | 9/2018 |
| WO | WO 2020/098930 | 5/2020 |

OTHER PUBLICATIONS

Notice of Allowance for U.S. Appl. No. 18/121,567 dated Oct. 17, 2023.
Foreign OA for CN Patent Appln. No. 20110855105.5 dated Oct. 31, 2023.
Non-Final Office Action for U.S. Appl. No. 17/367,282 dated Sep. 15, 2022.
Notice of Allowance for U.S. Appl. No. 17/367,282 dated Jan. 13, 2023.
Foreign Technical Examination for Danish Patent Appln. No. PA 2020 70500 dated Sep. 21, 2021.
Foreign Technical Examination for Danish Patent Appln. No. PA 2020 70500 dated Feb. 16, 2021.
Foreign Search report for Chinese patent application No. 202110855105.5 issued on Aug. 20, 2024.

* cited by examiner

HEAD-WEARABLE HEARING INSTRUMENT WITH IMPROVED CO-EXISTENCE OF MULTIPLE COMMUNICATION INTERFACES

RELATED APPLICATION DATA

This application is a continuation of U.S. patent application Ser. No. 18/121,567, filed on Mar. 14, 2023, which is a continuation of U.S. patent application Ser. No. 17/367,282 filed on Jul. 2, 2021, now U.S. Pat. No. 11,653,158, which claims priority to, and the benefit of, Danish Patent Application No. PA 2020 70500 filed on Jul. 27, 2020. The entire disclosure of the above application is expressly incorporated by reference herein.

FIELD

The present disclosure relates in a first aspect to a head-wearable hearing instrument comprising first and second housing portions and a radio-frequency data communication interface configured to transmit and receive data packets at transmit and receipt time slots, respectively, through a wireless communication channel. The head-wearable hearing instrument comprises a connector assembly configured to electrically and mechanically interconnect the first housing portion with the second housing portion. The second housing portion comprises a sensor configured to measure a physical property and generate sensor data representative of the measured physical property. The head-wearable hearing instrument further comprises a wired data communication link extending between the first and second housing portions through the connector assembly for transmission of sensor data during transmit time slots. Said transmit time slots of the sensor data and at least said receipt time slots of the wireless communication channel are non-overlapping in time.

BACKGROUND

Head-wearable hearing instruments such as hearing aids, headsets, active noise suppressors, are known in the art and typically comprise a microphone arrangement which includes one or more microphones for receipt of incoming sound such as speech and music signals. The incoming sound may be converted to an electrical microphone signal or signals that are amplified and/or processed in a processing circuit of the instrument. The head-wearable hearing instrument may additionally comprise an output amplifier that delivers a processed output signal, e.g. hearing loss compensated output signal, to the user's ear canal via an output transducer such as a miniature speaker, receiver or possibly electrode array. The head-wearable hearing instrument typically comprises a radio-frequency (RF) wireless data communication interface for communication or streaming of various types of useful digital signals like sound, music, speech with an external device such as a smartphone, tablet device, Tv-sets etc. The radio-frequency (RF) wireless data communication interface may be Bluetooth compliant operating in the 2.4 GHz frequency band and thereby allow the head-wearable hearing instrument to wirelessly connect to numerous types of readily available external devices.

A particular type of head-wearable hearing instruments are known in the art as so-called Receiver-in-Ear (RIE) instruments t in which a first housing portion, often designated BTE module or section for hearing aids, is configured for placement at, or behind, the user's ear. A second housing portion, often denoted RIE module, is configured, e.g. shaped and sized, for placement at least partly in the user's ear canal. The BTE module and RIE module of this type of head-wearable hearing instrument are often mechanically and electrically interconnected via a suitable, and possibly, releasable flexible connector arrangement. The above-mentioned radio-frequency wireless data communication interface is typically fully or at least partly arranged inside the BTE module.

The RIE module may comprise one or several sensors that are configured to measure respective physical properties associated with the operation of the hearing instrument such as ear canal sound pressure, ear temperature, EEG signals, or spatial orientation of RIE module. The sensor signals may be transmitted to a processor e.g. microprocessor or DSP, of the BTE module as digital data by a suitable wired data communication interface or link of the RIE module and through the connector assembly.

There exist a general desire to integrate an increasing number of such sensors in the RIE module while the sophistication of each of these sensors also tends to increase with the continuing progress of semiconductor fabrication and MEMS technologies. These circumstances make it feasible to monitor an increasing number of parameters associated with the operation of the head-wearable hearing instrument and as such of potential relevance for e.g. an audiologist's evaluation of the performance of the instrument or generally for the user's experience and satisfaction with the instrument.

However, the increasing number and sophistication of these sensors in the RIE module lead to an increasing data rate or frequency on the data communication interface of the RIE module and possibly to a more continuous streaming of these data over time to the BTE module via the data communication interface. The increasing data rate and on the data communication interface unfortunately leads to an increasing level and bandwidth of EMI noise induced by the wired data communication interface which noise for example is emitted from wiring of the connector assembly. This increasing level and bandwidth of EMI noise cause various interference problems with the radio-frequency (RF) wireless data communication interface such that wireless data reception at the head-wearable hearing instrument may be interrupted or the wireless range reduced.

This problem is addressed and solved by one or more embodiments described herein. For example, in one or more embodiments described herein, the above problem may be addressed by preventing (e.g., by configuration or adaptation of the processor of the BTE module) overlap between time slots where the wired communication interface of the RIE module is active and time slots where the wireless data communication interface is active.

SUMMARY

A first aspect relates to a head-wearable hearing instrument comprising:
- a first housing portion configured for placement at, or behind, a user's ear and comprising a radio-frequency data communication interface configured to transmit and receive data packets at transmit and receipt time slots, respectively, through a wireless communication channel;
- a connector assembly configured to electrically and mechanically interconnect the first housing portion with a second housing portion. The second housing portion is configured for placement in the user's ear canal and comprising a sensor configured to measure a physical property associated with operation of the head-wearable hearing instrument and generate sensor data representative of the measured physical property. The head-wearable hearing instrument further comprises a wired data communication link extending between the first and second housing portions through the connector assembly for transmission of sensor data during transmit time slots defined by a processor e.g. a processor arranged in the first housing portion; wherein said transmit time slots of the sensor data and at least said receipt time slots of the wireless communication channel are non-overlapping in time.

The present disclosure addresses and solves the above-discussed problems with existing RIE hearing instruments by utilizing non-overlapping time slots for receipt of the data packets of the wireless communication channel and transmission of sensor data, e.g. sensor data packets or sensor data messages.

In certain embodiments the transmit time slots of the sensor data or sensor messages on the wired communication link and said transmit time slots of the wireless communication channel are non-overlapping in time. The skilled person will appreciate that the receipt time slots at head-wearable hearing instrument are most noise and interference critical, because of the relatively high noise sensitivity of typical radio transceiver circuits as discussed in additional detail below with reference to the appended drawings.

The first housing portion of the head-wearable hearing instrument may comprise a processor such as a software programmable microprocessor and/or dedicated digital computational hardware for example comprising a hard-wired Digital Signal Processor (DSP). In the alternative, the processor may comprise a software programmable DSP or a combination of dedicated digital computational hardware and the software programmable DSP. The software programmable microprocessor or DSP may be configured to perform any of the tasks described herein by suitable program routines or sub-routines or threads of execution each comprising a set of executable program instructions. The set of executable program instructions may be stored in a non-volatile memory device of the first housing portion of BTE module. The microprocessor and/or the dedicated digital hardware may be integrated on an ASIC or implemented on a FPGA device.

The processor is preferably configured to define the time slots for transmission of the sensor data messages or packets by polling a data interface in the second housing portion coupled to the wired data communication link. The processor may be aware of the transmit time slots and receipt time slots of the wireless communication channel by knowledge of the communication protocol thereof e.g. Bluetooth LE and/or knowledge of the current connection parameters. In this manner, the processor can be configured to poll the data interface of the wired data communication link at appropriate time instants to ensure non-overlap with the known transmit time slots and receipt time slots of the wireless communication channel as discussed in additional detail below with reference to the appended drawings.

The second housing portion may comprise:
a stiff hollow shell accommodating therein at least the miniature loudspeaker, the sensor and a first data communication interface coupled to the wired data communication link,
a compressible elastomeric ear plug or mushroom releasably coupled to the stiff hollow shell and shaped and sized for placement within the user's ear canal. In other embodiments, the stiff hollow shell is customized to the user's ear canal geometry and may have been fabricated by an impression or 3D scanning of the user' ear canal e.g. using various additive manufacturing techniques.

The second housing portion comprise may one or more additional sensors configured to measure respective physical properties or variables; said one or more additional sensors may e.g. be connected to the wired data communication link via respective data interfaces or through a shared data interface. The sensor or sensors arranged in the second housing portion may comprise at least one of:
a microphone arranged to pick-up ear canal sound pressure of the user or to pick-up sound pressure from an external environment at the user's ear;
ear temperature;
a spatial orientation of the second housing portion for example using a MEMS gyroscopic sensor;
electroencephalography (EEG) signals of the user e.g. via suitable electrodes in contact with the user ear canal.

The user's ear canal sound pressure may be helpful to various active occlusion suppression algorithms or functions executed by the processor while pick-up of sound pressure from the external environment at the user's ear may be used by a beamforming algorithm using multiple microphones at different locations of the head-wearable hearing instrument. The first housing portion may for example comprise another microphone.

The second housing portion preferably comprises a receiver or miniature loudspeaker configured to emit sound in accordance with an audio drive signal supplied through at least two electrically conducting wires or traces of the connector assembly.

The radio-frequency data communication interface may comprises a Bluetooth or Bluetooth LE compliant interface or other standardized wireless communication interface for example operating in the 2.4 GHz range. A communication protocol of the radio-frequency data communication interface may comprise a plurality of successive connection events defining the receipt time slots and the transmit time slots as discussed for a Bluetooth LE implementation in additional detail below with reference to the appended drawings. The radio-frequency data communication interface may comprise an RF antenna, e.g. configured for operation in the 2.4 GHz band, comprising at least one electrically conductive wire or trace of the connector assembly, for example including electrically conductive wires of the wired data communication link. Alternatively, the RF antenna may be arranged inside the first housing portion and for example comprise one or more coiled traces of an electronics carrier substrate, e.g. multi-layer printed circuit board, supporting the processor and/or other electronic components of the first housing portion.

The first housing portion may be physically connected to an external portable or non-portable communication device such a smartphone or tablet etc. during said successive connection events and disconnected during intermediate idle time periods as discussed in additional detail below with reference to the appended drawings.

Other embodiments of the radio-frequency data communication interface may be based on Near Field Magnetic Induction (NFMI) and operate in a much lower MHz frequency band or range—for example using a carrier frequency between 1 MHz and 30 MHz, more preferably using a carrier frequency of 10.66 MHz, or 13.56 MHz, or 22.66 MHz, etc. NFMI communication systems have a short range, typically less than 2 m, and these embodiments of the present radio-frequency data communication interface are particularly well-suited for ear-to-ear communication between a pair of head-wearable hearing instruments such as left ear and right ear hearing aids of a binaural hearing aid system. The NFMI antenna of the head-wearable hearing instrument may be embedded in multilayer printed circuit board (PCB) arranged in the first housing portion. The NFMI antenna may comprise a coil, preferably a coil with a magnetic core.

The wired data communication link may be proprietary or compliant with an industry standard such as I²C, SPI, one-wire, etc. The wired data communication link may comprise a clock signal that may be helpful to synchronize events of the first housing portion and events of the second housing portion.

The second housing portion may comprise a volatile or non-volatile memory circuit for temporary storage of sensor data from the sensor or multiple sets of sensor data from multiple sensors before these are read-out and transmitted to the first housing portion through a data interface circuit of the second housing portion.

The connector assembly may comprise a flexible portion or section and may comprise flexible carrier substrate and/or a flexible outer coating. The connector assembly preferably comprises a plurality of electrically conducting wires or traces interconnecting a wired data communication interface of the first housing portion with a wired data communication interface of the second housing portion as discussed in additional detail below with reference to the appended drawings.

The actual number of electrically conducting wires or traces of the connector assembly may vary depending on characteristics of the second housing portion, for example the number of transducers e.g. receivers and sensors like microphones, arranged therein. For practical reasons such as size and costs, the number of connector wires will typically be less than 10 for example between 2 and 8 connector wires. Various design efforts may be undertaken to minimize the number of connector wires for example implementing multiple functionalities of a particular connector wire.

The connector assembly may be coupled to the first or second housing portion in a releasable manner via a pair of connector elements like plugs and sockets. A first connector element may comprise a plug with a plurality of electrical terminals and second connector element may comprise a mating socket, or vice versa, as discussed in additional detail below with reference to the appended drawings.

A second aspect relates to a method of controlling data transmission time slots through a wired communication interface between first and second interconnected housing portions of a head-wearable hearing instrument, said method comprising:
 a) determine receipt time slots of data packets of a radio-frequency data communication interface of the first housing portion by a processor thereof,
 b) measure a physical property associated with the operation of the instrument by at least one senor of the second housing portion,
 c) generate sensor data representative of the measured physical property,
 d) transmit the sensor data to the first housing portion through a wired data communication link extending through a connector assembly between the first and second housing portions at data transmit time slots defined by the processor,
 e) control the data transmit time slots of the wired communication link such that they do not overlap said receipt time slots of the radio-frequency data communication interface.

BRIEF DESCRIPTION OF THE DRAWINGS

Embodiments are described in more detail below in connection with the appended drawings in which.

DESCRIPTION OF THE EMBODIMENTS

Figure 1:
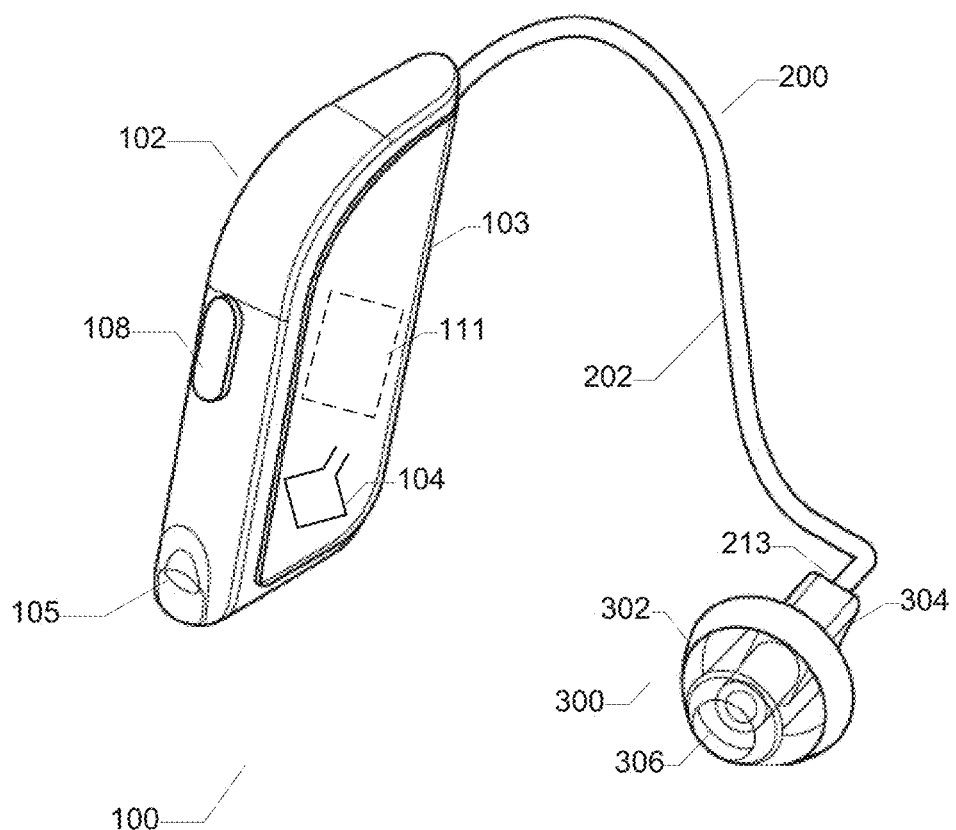
FIG. 1 is a schematic drawing of an exemplary Receiver-in-Ear (RIE) hearing instrument in accordance with various embodiments.

Various exemplary embodiments of a Receiver-in-Ear (RIE) type of head-wearable hearing instrument and details are described hereinafter, with reference to the figures when relevant. It should be noted that the figures may or may not be drawn to scale and that elements of similar structures or functions are represented by like reference numerals throughout the figures. Like elements or components will therefore not necessarily be described in detail with respect to each figure. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

In addition, the skilled person will further appreciate that certain actions and/or steps may be described or depicted in a particular order of occurrence while those skilled in the art will understand that such specificity with respect to sequence is not actually required.

FIG. 1 shows a schematic drawing of an exemplary Receiver-in-Ear (RIE) type of head-wearable hearing instrument in accordance with various embodiments. The RIE hearing instrument 100 comprises a first housing portion 102 and a second housing portion 300 mechanically and electrically connected to each other via a flexible connector assembly 200. The flexible connector assembly 200 may for example comprises flexible carrier substrate and/or an elastomeric or plastic tube 202 or coating and additionally comprises a plurality of electrically conducting wires or traces interconnecting a wired data communication interface of the first housing portion 102 with corresponding wired data communication interface of the second housing portion 304. The elastomeric or plastic tube 202 or coating preferably surrounds and protects the plurality of connector wires or traces.

The skilled person will appreciate that the first housing portion 102, or BTE module 102, typically is shaped and sized for placement at or behind a hearing impaired user's left or right ear—for example behind a back of the user's pinna where it may be at least partly hidden. The second housing portion 300 or RIE module 300 is typically shaped and sized for, or configured for, placement at least partly inside the user's ear canal. The RIE module 300 may comprise a stiff hollow shell customized shell (not shown) with an outer surface of geometry fitting to the user's ear canal. The customized shell (not shown) may have been fabricated from an impression or 3D scanning of the user' ear canal e.g. using various additive manufacturing techniques. The customized shell (not shown) may accommodate therein at least a miniature loudspeaker (not shown) for receipt of an audio drive signal through a pair of connector wires as discussed below in additional detail. The miniature loudspeaker (not shown) may be enclosed within the customized shell (not shown) and serve to attenuate sound pressure leakage and protect the miniature loudspeaker from potentially harmful forces and contaminants of the external environment such as dust, humidity, light and mechanical shocks.

Figure 2:
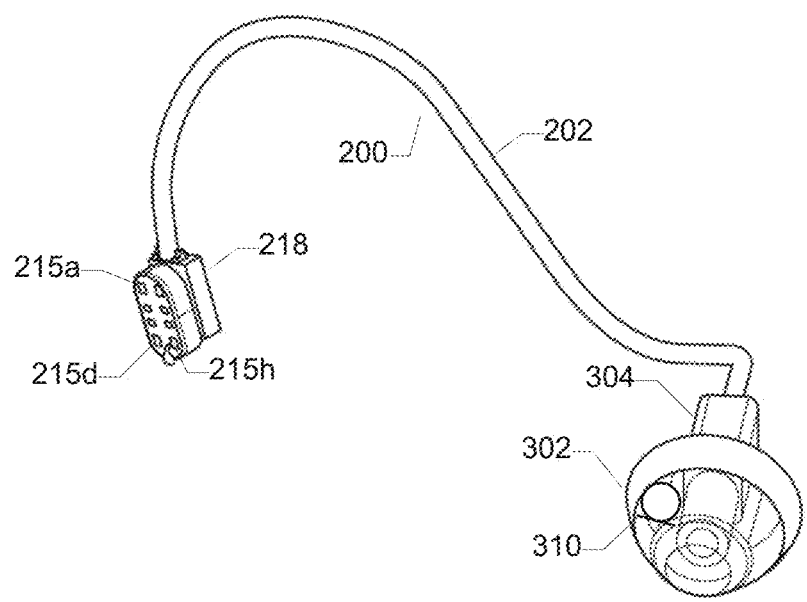
FIG. 2 shows an in-the-ear housing portion and a flexible connector assembly of the Receiver-in-Ear (RIE) hearing instrument.

Alternative embodiments of the RIE module 300 has no customized shell but utilizes a standardized rigid and hollow housing 304 surrounded by a compressible plug or mushroom 302 which is shaped and sized for anchoring within the user's ear canal. The compressible plug 304 may comprise an elastomeric substance, e.g. silicone, and preferably comprises a sound channel or port 306 transmitting or conveying sound signals, or output sound pressure, generated by the miniature loudspeaker towards the eardrum of the user. The compressible plug 302 is configured to be comfortably positioned and retained within user's ear canal during use of the RIE hearing instrument 100. The compressible plug 302 may be interchangeable and comprise various types of elastomeric compounds or foam compounds with suitable wear-and-tear properties. The skilled person will appreciate that the compressible plug 302 may be fabricated in numerous sizes to fit different ear canal sizes of different hearing aid users. The RIE module 300 additionally comprises at least one sensor 310 (not shown here but refer to FIG. 2) configured to measure a physical property for example property associated with operation of the head-wearable hearing instrument and generate sensor data representative of the measured physical property.

A proximal end 213 of the previously discussed flexible connector assembly 200 may be fixedly terminated at the rigid housing structure 304 of the RIE module 300 and the plurality of electrical connector wires or traces connected to the electrical circuitry held in the rigid housing structure 304. As illustrated on FIG. 2, in certain embodiments of the RIE hearing instrument 100, a plug 218 comprising a plurality of electrical terminals or pads 215a-215h such as more than 4 or 6 or 10 terminals arranged at distal end of the flexible connector assembly 200. Each of the electrical terminals or pads 215a-215h may mate in a releasable manner to a corresponding electrical terminal (not shown) of a corresponding connector element or connector socket (not visible) arranged at a rear surface of the first/BTE housing portion 102.

The connector assembly 200 typically comprises a plurality of electrically conducting wires or traces 208a-h (shown on FIG. 3)—for example between 2 and 10, such as eight, individual electrical wires configured to interconnect various electrical circuit components of the BTE and ITC housing portions 102, 304 as discussed below in additional detail.

The BTE housing portion 102 may comprise a hollow relatively rigid housing structure 103 accommodating therein various electronic circuitry of the first housing portion 102. This rigid housing structure 103 may be fabricated by injection moulding of a suitable elastomeric compound. The rigid housing structure 103 serves to protect the components and electronic circuitry of the first housing portion 102 from potentially harmful forces and contaminants of the external environment such as dust, humidity, light and mechanical shocks. The first housing portion 102 may comprise a battery chamber 105 for holding a disposable battery such as a Zinc-Air battery cell. Other embodiments of the RIE hearing instrument 100 may comprise a rechargeable battery cell or cells. The first housing portion 102 may comprise a front microphone (not shown) and/or a rear microphone (not shown) for conversion of an acoustic sound signal into respective audio sound signals and one or several A/D converters (not shown) for conversion of the audio sound signals into respective digital audio signals. The first housing portion 102 may comprise a processor 111, such as software programmable microprocessor or DSP 111, configured to generate a hearing loss compensated sound signal based on the digital audio signals supplied by the microphone(s). The software programmable microprocessor or DSP 111, may additionally be configured to handle various control and I/O data transmission tasks of the RIE hearing instrument 100. The software programmable microprocessor or DSP 111 may additionally be configured to generate a hearing loss compensated output signal, or audio drive signal, computed by a hearing loss compensation algorithm executing on the software programmable microprocessor or DSP 111. The audio drive signal may be transmitted through a dedicated pair of connector wires of the plurality of connector wires discussed above to a receiver or miniature loudspeaker enclosed within the second housing portion 300. The first housing portion 102 may comprise various user interface features such as a user actuable button or switch 108 allowing the user to control various functions and settings of the RIE hearing instrument 100 in accordance with his/hers own preferences such as a volume setting and preset program selection etc. The first housing portion 102 further comprises a radio-frequency data communication interface which includes an RF antenna 104 coupled to a wireless transceiver 116 and wireless interface 114. The skilled person will understand that the wireless transceiver 116 and wireless interface 114 may be separate circuit blocks or be integrated with the processor 111 on a common semiconductor substrate or die. The radio-frequency data communication interface is configured to transmit and receive data packets at transmit and receipt time slots, respectively, through a wireless communication channel 400 as discussed in additional detail below with reference to FIGS. 3 and 4.

The RF antenna 104 is arranged inside the first housing portion 102 and for example comprise one or more coiled traces of an electronics carrier substrate (not shown) supporting the processor 111. In alternative embodiments the RF antenna 104 comprises at least one electrically conductive wire or trace 208a-h (on FIG. 3) of the connector assembly 200, for example including electrically conductive wires of the wired data communication link.

Figure 3:
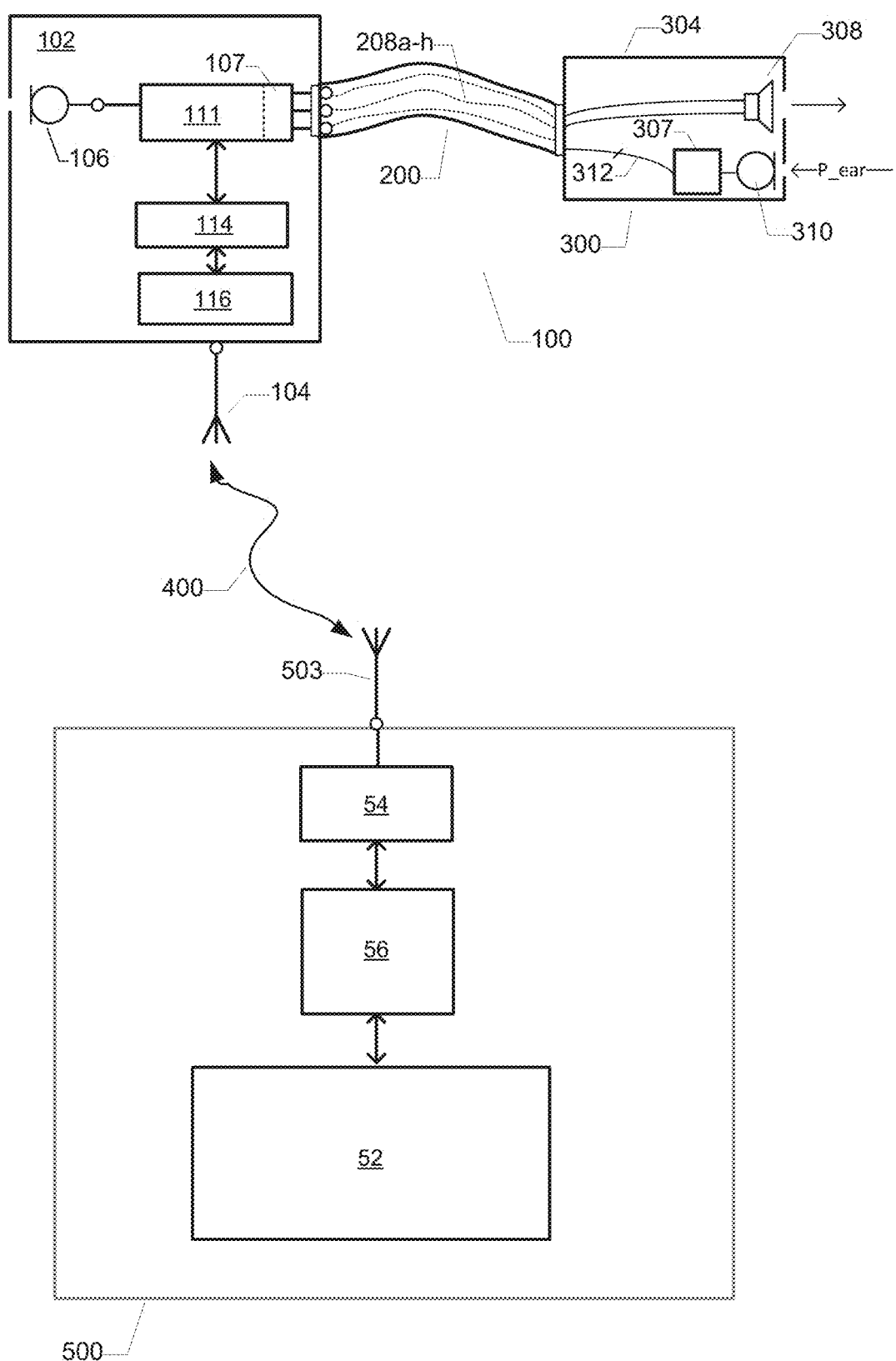
FIG. 3 shows a simplified block diagram of various parts of the Receiver-in-Ear (RIE) hearing instrument and a block diagram of an external mobile terminal.

FIG. 3 shows a simplified block diagram of various parts of the Receiver-in-Ear (RIE) hearing instrument 100 and a block diagram of an external terminal 500 which is wirelessly connected to the RIE hearing instrument 100 via a bidirectional or one-way wireless communication channel 400. The external terminal may comprise a battery powered portable or mobile device like a smartphone or may alternatively comprise a stationary mains powered device like a Tv streamer etc. FIG. 3 also shows a simplified electric block diagram of the exemplary RIE hearing instrument 100 discussed above. The illustrated embodiment of the RIE Module 300 comprises, in addition to the previously discussed miniature loudspeaker or receiver 308, a microphone 310 arranged to pick-up ear canal sound pressure, p_ear, of the user. In other embodiments of the RIE Module 300 the microphone may be arranged to pick-up sound pressure from an external environment at the user's ear, i.e. the microphone sound inlet may be oriented in an opposite direction. The skilled person will appreciate that other embodiments of the RIE Module 300 may comprise additional sensor(s) or alternative types of sensor(s) for example least one of:

ear temperature measurement device;
a spatial orientation of the second housing portion 300;
electroencephalography (EEG) signals of the user for example via suitable electrodes contacting the ear canal wall of the user.

The RIE Module 300 and the BTE housing portion 102 are mechanically and electrically interconnected in a releasable manner via the previously discussed mating pairs of connector terminals P1-P8 and their associated connector wires. The miniature loudspeaker 308 (refer to FIG. 3) is connected to complementary phases of the previously discussed audio drive signal delivered by an H-bridge output driver (not shown) through the connector terminals 215a, 215b and their associated connector wires. An H-bridge class D output driver (not shown) may be integrated on a common semiconductor substrate or die together with the DSP or microprocessor 101 of the first housing portion 102. The microphone 310 of the RIE Module 300 may be energized by one more wires 208a-h of the flexible connector assembly 200 which are connected to the appropriate electronic circuitry, e.g. a regulated DC voltage supply, of the first housing portion 102. An output signal of the microphone 308 is electrically connected to a data interface circuit 307 which preferably comprises an A/D converter to digitize the microphone output signal in an appropriate format e.g. 16 bits at 16 kHz. The data interface circuit 307 is configured to convert the raw digital microphone signal into an appropriate data format before transmission as sensor data messages over a wired data communication link 312 extending through the flexible connector assembly 200 using one or several wires to a corresponding or compatible data interface 112 arranged inside the BTE housing portion 102 for example integrated on the microprocessor 111 as schematically indicated. The data interface circuits 307, 107 and wired data communication link 312 may be configured to transmit/receive data by a proprietary protocol or by standardized data communication protocol like I²C, SPI, one-wire, etc. Data transmitted through the one-wire data interface may for example be Manchester encoded.

Certain embodiments of the RIE module 300 may comprise a non-volatile memory circuit 212 for example comprising an EEPROM, EPROM or flash memory that stores various types of calibration data or parameters and/or ID data associated with the sensor or sensors, e.g. the microphone 310, and/or other components of the RIE module 300.

The wireless communication channel 400 may be exploited to communicate various types of data between the BTE housing portion 102/hearing instrument 100 and various types of an external portable, or non-portable, devices 500 such as smartphones, laptop computers, Tv-sets, alarm systems etc. These data may comprise streaming of audio data such as music or speech from the external device 500 to the head-wearable hearing instrument 100.

Figure 4:
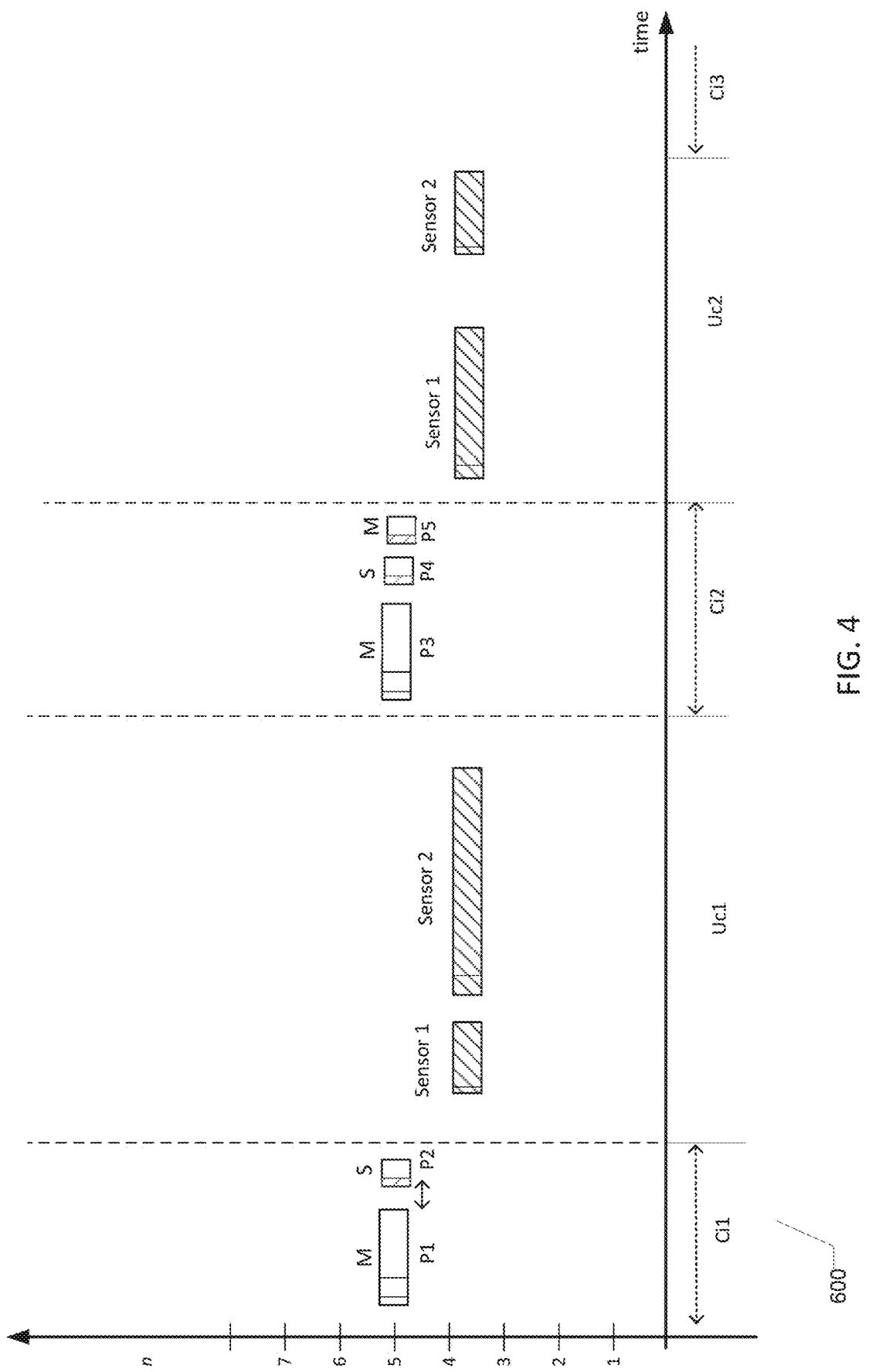
FIG. 4 shows a timing diagram for data exchange over a wireless communication channel and data exchange over a wired data link between a RIE module detection sub-routine executed by the processor of the Receiver-in-Ear (RIE) hearing instrument.

FIG. 4 shows an exemplary timing diagram 600 for data exchange over the wireless communication channel 400 and data exchange over the wired data communication link 312 extending between the RIE module 300 and BTE housing portion 102 through the flexible connector assembly 200. The wireless communication channel 400 and the data interface circuits 307, 107 are Bluetooth or Bluetooth LE compliant in the present embodiment but the skilled person will understand that other types of proprietary or standardized wireless interfaces may be utilizes with preference for communication standards that are low-power in view of the typically limited battery power and energy storage of batteries of hearing instruments.

The protocol of the Bluetooth LE compliant wireless communication channel 400 and interface comprises a plurality of successive so-called connection events Ci1, Ci2, Ci3 etc. in which the BTE housing portion 102 is physically, via the electromagnetic air interface, connected to the external device 500. The connection events Ci1, Ci2, Ci3 etc. are separated by intermediate idle time periods Uc,1 Uc2 etc. where the external device 500 and BTE housing portion 102 are disconnected. The connection events may be separated in time by between 2 ms and 25 ms such as about 15 ms and each connection event may last between 10 µs and 1000 µs such as about 565 µs. The RF transceiver 114, 116 in the BTE housing portion 102 may be powered-down during the idle-time periods Uc1, Uc2 etc. to conserve power.

In the present embodiment of the radio-frequency data communication interface and wireless communication channel 400 each of the connection events Ci1, Ci2, Ci3 are used as respective receipt time slots and transmit time slots of the wirelessly transmitted data packets or messages P1-P5 such that data packets P1 and P2 are transmitted in the first connection event Ci1 and data packets P3, P4 and P5 are transmitted in the subsequent connection event Ci2 and so forth. The first data packet P1 may for example be transmitted by the external device 500 to the hearing instrument 100 where it is received via the RF antenna 104 and radio transceiver/interface circuit 114, 116 and conveyed to the processor 111 for decoding/unpacking and storage. The hearing instrument 100 responds to receipt of the first data packet P1 with transmission of the second data packet P2 to the external device 500.

Hence, in the perspective of the hearing instrument 100 the beginning and end of the first data packet P1 defines a receipt time slot while the beginning and end of the second data packet P2 defines a transmit time slot. The second data packet P2 may for example include an acknowledgement bit or indicator signaling safe receipt of the first data packet P1 to the external device 500. The data packet P1, and the data packets P2-P5, are formatted in accordance with the communication protocol in question which may be Bluetooth LE. Each of the data packets P1-P5 may therefore comprise a header section and payload section holding various types of control information and audio data, respectively. Hence, in the present embodiment, each of the connection events Ci1, Ci2, Ci3 comprises both transmit and receipt time slots of the wireless communication channel 400.

During the first idle time period Uc1, the wireless communication channel 400 is silent or inoperative, e.g. because the wireless transceivers are powered down or shut down, while the respective sensor data packets or messages from sensor 1 and sensor 2 successively are transmitted during respective transmit time slots by the data interface circuit 307 of the RIE module 300 over the wired data communication link 312. These transmit time slots are defined by the processor 111 of the BTE housing portion 102. In the next connection event Ci2, the data packets P3, P4 and P5 are exchanged during respective transmit and receipt time slots of the wireless communication channel 400 and so forth. During the second idle-time period Uc2, the wireless communication channel 400 is again silent or inoperative while the respective new or updated sensor data packets or messages are transmitted by the data interface circuit 307 of the RIE module 300 during respective transmit time slots from sensor 1 and sensor 2 over the wired data communication link 312.

The skilled person will appreciate the processor 111 controls data communication such that the transmit and receipt time slots of the wireless communication channel 400 both are non-overlapping with the transmit time slots of the sensor data packets on the wired data communication link 312. Preferably, at least the receipt time slots, again as seen from the hearing instrument 100, of the wireless communication channel 400 and the transmit time slots of the wired data communication link 312 do not overlap in time because of the relatively high noise sensitivity of the radio transceiver/interface circuit 114, 116 which may corrupt the received data packets of the wireless channel 400. A minimum of signal interference or noise is secured by merely transmitting the sensor data packets or messages on the wired data communication link 312 when the wireless communication channel 400 is silent or inoperative and this feature prevents corruption of the wireless data packets and/or allows a higher data rate on the wireless communication channel 400.

The skilled person will therefore appreciate that other embodiments may utilize overlapping transmit time slots between the wireless communication channel 400 and the wired data communication link 312 because noise in the radio transceiver/interface circuit 114, 116 is less damaging such that for example transmission of the data packet P2 may overlap the sensor data message Sensor 1.

The processor 111 preferably ensures that the transmit and receipt time slots of the wireless communication channel 400 are non-overlapping with the transmit time slots of the sensor data packets or messages on the wired data communication link 312 by polling the data interface circuit 307 through the wired data communication link 312. The processor 111 is aware of the transmit time slots and receipt time slots of the wireless communication channel 400 by knowledge of the protocol thereof e.g. Bluetooth LE and/or knowledge of the current connection parameters. This is the case both when the processor 111 is configured as a master device and slave device of the wireless communication channel 400.

The processor 111 may therefore write a particular command to a suitable register of the data interface circuit 307 at known time instants such that the data interface circuit 307 in response transmits the sensor data message. The processor 111 may alternatively simply use a general purpose input-output port (GPIO) to assert a pin of the data interface circuit 307 by switching this pin between logic low and logic high or vice versa through the electrically conducting wires or traces of the flexible connector assembly 200. The state switching of the pin of the data interface circuit 307 may force the latter to transmit the sensor data message or messages.

The invention claimed is:

1. A hearing instrument comprising:
   a first portion comprising a radio-frequency data communication interface, the radio-frequency data communication interface configured for data transmission in transmit time slots and for data reception in receipt time slots, wherein the transmit time slots and the receipt time slots are associated with the radio-frequency data communication interface;
   a second portion comprising a sensor configured to generate sensor data;
   a wired data communication link extending between the first and second portions for wired-transmission of the sensor data from the second portion to the first portion in transmit time slots associated with the wired data communication link;
   wherein at least one of the transmit time slots associated with the wired data communication link is non-overlapping in time with respect to the receipt time slots and/or the transmit time slots associated with the radio-frequency data communication interface.

2. The hearing instrument according to claim 1, wherein the transmit time slots associated with wired data communication link and the transmit time slots associated with the radio-frequency data communication interface are non-overlapping.

3. The hearing instrument according to claim 1, wherein the first portion comprises a processor, and wherein the processor of the first portion is configured to define the transmit time slots for transmission of the sensor data by polling a data interface in the second portion via the wired data communication link.

4. The hearing instrument according to claim 1, wherein the second portion comprises one or more additional sensors configured to sense respective physical properties; and
   wherein the one or more additional sensors is connected to the wired data communication link via respective data interfaces or through a shared data interface.

5. The hearing instrument according to claim 1, wherein the second portion further comprises a receiver or miniature loudspeaker configured to emit sound in accordance with an audio drive signal supplied through at least two electrically conducting wires or traces.

6. The hearing instrument according to claim 1, wherein the radio-frequency data communication interface comprises a Bluetooth or Bluetooth LE compliant interface.

7. The hearing instrument according to claim 6, wherein a communication protocol of the radio-frequency data communication interface comprises a plurality of successive connection events defining the receipt time slots and the transmit time slots associated with the radio-frequency data communication interface.

8. The hearing instrument according to claim 7, wherein the first portion is physically connected to an external portable communication device during the successive connection events, and is disconnected during intermediate idle time periods.

9. The hearing instrument according to claim 1, wherein the wired data communication link is compliant with an industry standard.

10. The hearing instrument according to claim 1, wherein the second portion comprises:
    a stiff hollow shell accommodating therein a miniature loudspeaker and the sensor; and
    a compressible elastomeric ear plug or dome-structure releasably coupled to the stiff hollow shell, the ear plug or the dome-structure shaped and sized for placement within an ear canal.

11. The hearing instrument according to claim 1, wherein the radio-frequency data communication interface comprises an RF antenna, the RF antenna comprising at least one electrically conductive wire or trace.

12. The hearing instrument according to claim 1, wherein the radio-frequency data communication interface comprises an RF antenna inside the first portion.

13. The hearing instrument according to claim 1, wherein the sensor in the second portion is configured to detect:
ear canal sound pressure;
sound pressure from an external environment;
ear temperature;
a spatial orientation;
electrical activity associated with a brain.

14. The hearing instrument according to claim 1, wherein the second portion comprises a volatile or non-volatile memory circuit for storage of the sensor data.

15. The hearing instrument according to claim 1, further comprising a connector assembly associated with the wired data communication link, the connector assembly comprising a flexible carrier substrate or a flexible outer coating.

16. The hearing instrument according to claim 1, further comprising a connector assembly associated with the wired data communication link, the connector assembly comprising a plurality of electrically conducting wires or traces interconnecting a wired data communication interface of the first portion with a wired data communication interface of the second portion.

17. The hearing instrument according to claim 1, wherein the transmit time slots for transmission of the sensor data are defined by a processor.

18. The hearing instrument according to claim 1, wherein the wired data communication link for wired-transmission of the sensor data is configured for wireless communication with a device outside the hearing instrument.

19. The hearing instrument according to claim 18, wherein the wired data communication link comprises a wire, the wire connected to the sensor, and configured for the wireless communication.

20. The hearing instrument according to claim 1, wherein at least one of the transmit time slots associated with the wired data communication link is different from at least one of the transmit time slots associated with the radio-frequency data communication interface.

21. The hearing instrument according to claim 1, wherein the sensor is configured to sense a property, and to generate the sensor data based on the sensed property.

22. The hearing instrument according to claim 1, wherein the first portion is configured for placement at a first location above a neck of a user, and the second portion is configured for placement at a second location above the neck of the user.

23. The hearing instrument according to claim 1, wherein the first portion and the second portion are configured to be in contact with different respective ear parts of an ear of a user.

* * * * *